United States Patent
Gay, Jr.

[11] 3,892,552
[45] July 1, 1975

[54] FERTILIZER

[75] Inventor: Jacob Douglas Gay, Jr., Fayette County, Ky.

[73] Assignee: International Spike, Inc., Lexington, Ky.

[22] Filed: July 6, 1973

[21] Appl. No.: 377,120

[52] U.S. Cl. .......................... 71/1; 71/24; 71/28; 71/64 SC; 47/48.5
[51] Int. Cl. ............................................ C05c 9/00
[58] Field of Search ....... 71/64 A, 28, 24, 1, 64 SC, 71/64 G; 47/48.5

[56] References Cited
UNITED STATES PATENTS
3,502,458   3/1970   Schenk .......................... 71/64 A X Primary Examiner—Charles N. Hart
Assistant Examiner—Ferris H. Lander
Attorney, Agent, or Firm—Clelle W. Upchurch

[57] ABSTRACT

A dense, rigid one-piece molded fertilizer spike adapted to be driven into firmly compacted soil has an elongated body which is substantially elliptical in cross-section, a blunt end and a hemi-ellipsoidal shaped opposite end.

13 Claims, 7 Drawing Figures

3,892,552

FERTILIZER

This invention relates generally to fertilizers and more particularly to an improved slow-release fertilizer spike adapted to be driven into the ground.

It has been proposed before to provide slow-release fertilizer compositions. It is suggested, for example, in U.S. Pat. Nos. 3,150,955 and 3,647,416 that ureaform, a slowly water soluble urea-formaldehyde, should be used as the nitrogen source for fertilizers. It has been suggested in U.S. Pat. No. 3,502,458 that a thermoplastic or thermoset resin such as a phenolic or a urea-formaldehyde resin be used as a binder in a fertilizer composition which contains in addition to the sources of plant nutrients fibrous particles such as sawdust or peat moss. The porosity provided by the fibrous material is said to be related to the release of plant nutrients.

It has been proposed to shape slow-release fertilizer compositions into stakes or spikes adapted to be driven into the ground. For example, a pointed stick of fertilizer having granulated sources of nitrogen, phosphorous and potash bound together with the reaction product of fibrous asbestos and phosphoric acid is disclosed in U.S. Pat. No. 3,057,713. Such sticks have the disadvantage, however, of requiring the use of source materials which are more concentrated than would be required if the asbestos were not present as a diluent and are expensive to make. The slow-release fertilizer of U.S. Pat. No. 3,502,458 is disclosed in spike form but the spike must have a support rod extending longitudinally therethrough and protective covers to adapt it for driving into the soil. Manufacturing costs of such a spike are excessive. The slow-release fertilizer disclosed in U.S. Pat. No. 3,647,416 may have a shape resembling that of a cold chisel. The shaped product is formed by extrusion of a composition containing a filler such as petroleum coke, sand, clay or coke breeze and a reaction product of magnesia and phosphoric acid as a binder. The cold chisel shaped fertilizer has the disadvantage that its manufacture requires handling of corrosive phosphoric acid during preparation of the composition and the further disadvantage of employing an extrusion process which requires a post cutting step to provide the slanted or beveled surfaces.

Additional slow-release fertilizer compositions are disclosed in U.S. Pat. Nos. 3,269,824; 3,259,482; 3,264,088; 3,192,031; 879,877; 1,971,390; 2,032,608; 2,117,808; 2,341,800 and 3,024,098.

Other cartridges of fertilizer for insertion in the soil are disclosed in U.S. Pat. Nos. 2,931,140 and 3,060,012 but they require special containers which are impractical for commercial production.

It is an object of this invention to provide an improved molded fertilizer spike having a shape which is practical to manufacture and which adapts the spike to be driven into firmly compacted soil without significant shattering. Another object of the invention is to provide a slow-release fertilizer molded to a configuration which can be produced by mass production methods and which adapts it to be driven into firmly compacted soil and which can contain up to more than 90 percent nitrogen, phosphorous and potash source materials. A further object of the invention is to provide a fertilizer spike of such shape and composition that it is easily molded by mass production methods at low cost and does not require supporting rods to be driven into firmly compacted soil without significant shattering. A still further object of the invention is to provide a molded homogeneous slow-release fertilizer adapted to be driven into the ground and may consist essentially of compressed granular fertilizer source materials and a minor amount of a binder. Still another object of the invention is to provide a novel protective cap for the shaped fertilizer and the thus protected shaped product.

Other objects will become apparent from the following description with reference to the accompanying drawing wherein FIG. 1 is a side elevation of one embodiment of the protective cap provided by the invention;

Figure 1:
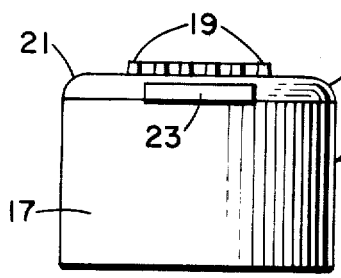
Figure 2:
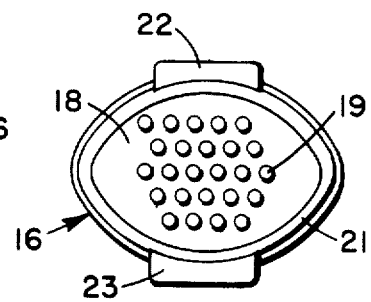
FIG. 2 is a plan view of the embodiment of FIG. 1.
Figure 3:
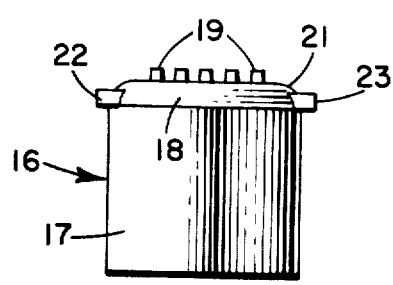
FIG. 3 is an end elevation of the embodiment of FIGS. 1 and 2.

The foregoing objects and others are accomplished in accordance with this invention, generally speaking, by providing a molded generally wedge-shaped hard, rigid fertilizer spike containing particles of NPK fertilizer source materials bound together by a cured substantially water insoluble thermoset resin into a substantially homogenous composition which is adapted to be driven into the ground as a supply of slow-release plant nutrients. More specifically, the invention provides a fertilizer spike containing granular particles of fertilizer source materials bound together by a cured thermoset resin into a wedge-shaped configuration having an elongated body portion which is substantially elliptical in cross-section, a blunt end and a pointed end. Preferably, the blunt end is a boss or knob on the end of the body having a driving surface which lies in a plane substantially perpendicular to the longitudinal axis of the body. A substantially ellipsoidal shaped end portion of the spike is integral with the body portion. In other words, the invention provides a molded one-piece fertilizer product which generally resembles a wedge in shape with the body portion being substantially elliptical-cylindrical and the penetrating end portion being of gradually decreasing elliptical cross-section to provide a substantially hemi-ellipsoidal shaped end for penetration of the soil as the spike is driven into the ground. In a preferred embodiment, that end of the spike to be struck when the spike is driven into the ground is a centrally disposed boss or knob which extends upwardly from the body. Sharp easily shattered edges on the body around the base of the boss are avoided by providing a peripheral edge on the body which is arcuate shaped in cross-section.

It has been found that the wedge-shaped spike provided by this invention can be driven into firmly compacted soil without significant shattering. Moreover, of substantially equal importance, the wedge-shape can be molded by mass production methods with a conventional type briquetting machine. The invention thus provides a method for making the novel shaped fertilizer spike wherein non-fibrous granular fertilizer source materials are mulled or otherwise mixed until coated with an uncured thermosetting resin and a substantially homogeneous mixture is obtained. The mixture is charged to the mold halves carried by the wheels of the briquetting machine where it is compressed into the wedge-shaped configuration under a pressure of several thousand pounds per square inch and sufficient to provide a briquette which can be handled and packaged without significant crumbling. The resinous binder cures into a thermoset resin and firmly binds the molded fertilizer source particles together into a one-piece homogeneous fertilizer product having a specific gravity of from about 1.7 to about 1.8. Curing of the resin may be accelerated by heating the green wedge-shaped briquette but additional heating after briquetting is usually not necessary. The temperature of the mixture increases to 125°F. or hotter from friction between the particles thereof during briquetting and the briquette will cure sufficiently in about 1 hour to be driven into the ground.

Although the wedge-shaped spike can be driven into most soil without a protective cap, the invention provides a molded rubber or plastic protective cap which may be used to advantage for driving spikes into firmly compressed soil or by the housewife or other amateur gardener whose aim with a hammer might not always be accurate. The novel cap has a substantially elliptical cross-section corresponding substantially to the cross-section of the spike body and has a tubular body adapted to enclose the boss, shoulder and a part of the body of the spike. Any suitable impact resistant synthetic resin adapted to be shaped by injection molding, casting or other conventional plastic molding techniques may be used for molding the cap such as, for example, polypropylene, polyethylene, polycarbonate or polyurethane.

Figure 4:
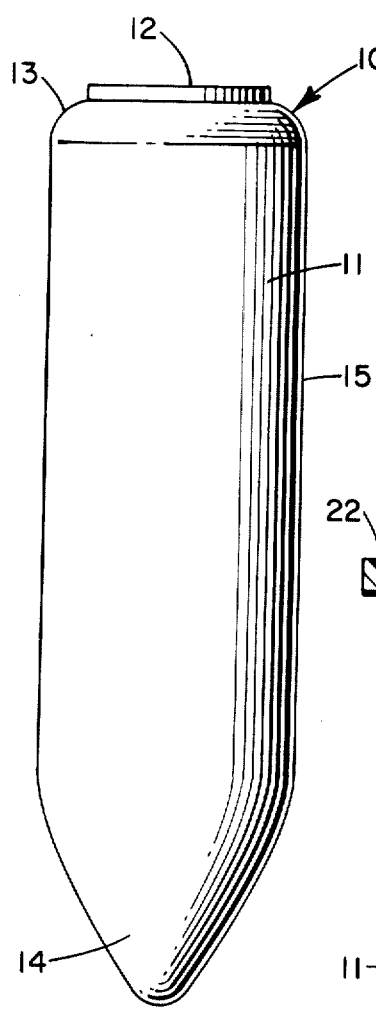
FIG. 4 is a front elevation of an embodiment of the molded fertilizer provided by the invention.
Figure 5:
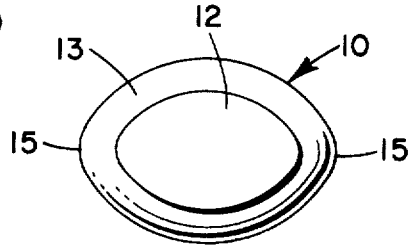
FIG. 5 is a plan view of the embodiment of FIG. 4.
Figure 6:
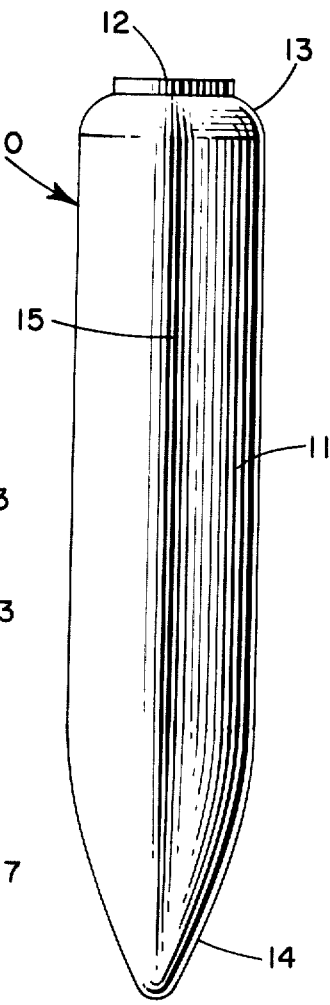
FIG. 6 is a side elevation of the embodiment of FIGS. 4 and 5.

Referring now to the drawing, the novel one-piece wedge-shaped spike 10 is illustrated in FIGS. 4–7. Spike 10 has an elongated body portion 11 which is substantially elliptical in cross-section (FIG. 5). A boss 12 projects upwardly (as shown in FIGS. 4 and 6) from body 11. The upper surface of boss 12 is substantially flat and lies in a plane which is substantially perpendicular to the longitudinal axis of the spike 10. The peripheral edge 13 of body 11 about the base of boss 12 is arcuate shaped in cross-section (FIG. 7) to avoid substantial shattering of the edge by a mis-directed blow while driving the spike 10 into the ground. The pointed or penetrating end 14 (the lower end as shown in FIGS. 4 and 6) of spike 10 is integral with body 11 and has the general shape of one-half or less of an ellipsoid. In other words, end 14 of spike 10 is substantially hemi-ellipsoidal shaped.

The spike 10 may be shaped from a substantially homogenous granular mixture of NPK fertilizer source materials and an uncured urea-formaldehyde resin by a conventional type briquetter having mold cavities of the proper configuration. The briquetter has two rotatable molding drums or wheels each provided with a mold cavity having the shape of one-half of the spike. The two wheels are disposed one over the other. The homogeneous mixture is charged to the mold cavities of each wheel such as by a screw conveyor and rotation of the wheels is synchronized so a mold cavity on one wheel is aligned with a mold cavity of the other wheel and fertilizer mixture is compressed in the cavity under pressure sufficient to form a briquette of the configuration illustrated in FIGS. 4 and 6. A pressure of 30 tons is usually sufficient. The particles of the mixture become sufficiently mechanically bound together to permit handling and/or packaging without significant loss of fertilizer through crumbling. A web or mold flash 15 of fertilizer extends along the longitudinal median line of the side of the spike as shown best in FIG. 6. Web 15 is formed by fertilizer mixture compressed between the edges about the mold cavities when they come together.

Figure 7:
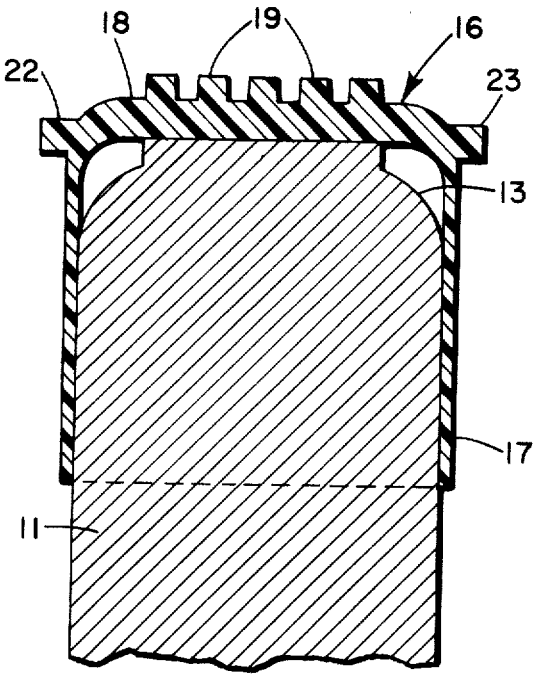
FIG. 7 is a fragmentary longitudinal section of the cap of FIGS. 1 through 3 disposed on the embodiment of a molded fertilizer of FIGS. 4 through 6.

An embodiment of the protective cap 16 provided by the invention is illustrated in FIGS. 1–3 and 7. Cap 16 has a tubular wall 17 which is elliptical in cross-section and of sufficient dimensions for cap 16 to fit snugly over boss 12 and a portion of body 11. Cap 16 may be injection molded polyethylene. A closed end 18 integral with wall 17 is provided with a plurality of spaced integral upwardly extending substantially cylindrical peg-like protuberances 19 centrally disposed about the longitudinal axis of cap 16. Protuberances 19 provide the striking surface of cap 16 and are preferably confined to the area that will be disposed immediately above boss 12, as illustrated in FIG. 7. The radius of curvature between closed end 18 and wall 17 of cap 16 is less than that of shoulder 13 (FIG. 7) so an annular space 20 is provided between shoulder 13 and cap 16. Some of the energy of the impact of a poorly aimed blow which strikes the peripheral edge portion 21 of boss 10 will be absorbed by displacement of peripheral edge 21 inwardly with compression of the air in space 22 and the striking tool will tend to slide over the surface of the compressed edge 21 away from shoulder 13 thereby avoiding significant shattering of spike body 11. A pair of oppositely disposed circumferentially spaced integral flanges 22 and 23 extend radially outwardly from peripheral edge 21 to provide ears to assist in removing cap 16 from spike 10.

Any suitable resinous binder which is not toxic to plants and which can be mixed substantially uniformly with the particles of fertilizer souce materials while uncured and will cure after molding to firmly bind the particles together may be used but best results have been obtained so far with urea-formaldehyde resin so it is preferred. Other suitable synthetic thermosetting resins include melamine formaldehyde and phenolic resins. Preferably the binder should be one that is water insoluble after curing. A preferred urea-formaldehyde resin is sold by Monsanto Company as "UF-71."

Any suitable granular fertilizer source material may be used. The amounts of available nitrogen, phosphorous and potash, "NPK," may be varied in accordance with the requirements of the plants to be fertilized. Conventional fertilizer percentages such as 16:8:8; 8:4:4; 5:5:5; 15:5:5 or 22:11:11 or the like may be provided by the spike of the invention. Often, the greater the concentration of N:P:K, the smaller the number of spikes required.

Typical formulations of mixtures to be shaped by briquetting into a wedge-shaped spike are prepared by mulling:

| | |
|---|---|
| 55 parts ammonium sulfate | (21-0-0) |
| 10.8 parts Urea-form such as DuPont's "Uramite" | (38-0-0) |
| 20.4 parts Diammonium Phosphate | (18-46-0) |
| 15.6 parts Potassium Chloride | (0-0-62) |
| 2.2 parts Fritted trace elements such as those available from Ferro Corp. | (0-0-0) |
| 0.12 part dye (if desired) | (0-0-0) |
| 10 parts urea-formaldehyde | |

| -Continued | |
|---|---|
| resin such as Monsanto Company's "UF-71" | (0-0-0) |
| 0 – 1.7 parts moisture in the mixture | (0-0-0) |

The solids of the above mixture preferably have a granulation such that they will pass through a 20 mesh screen. The mixture is mulled until the uncured urea-formaldehyde coats particles of the fertilizer source materials and measured amounts of the mixture is then molded under about 30 tons pressure in a briquetting machine. The molded "green" spike is allowed to cure at room temperature.

Other fertilizer source materials may be substituted for those above. For example, urea, ammonium nitrate, mono-ammonium phosphate or other known sources of nitrogen may be used alone or in mixtures. Triple super phosphate, normal super phosphate or mono-ammonium phosphate may be used to supply the phosphorous. Potassium sulfate may be used as the source of potash. Trace elements and secondary nutrients such as calcium, magnesium and sulfur may be included in the mixture, if desired. The trace elements may include iron, copper, manganese, barium, zinc and molybdenum. The urea-formaldehydes or other thermoset resinous binder is not expected to contribute to the plant nutrients. The urea-formaldehyde resin used as the binder should be in an uncured form at the time it is mixed with the fertilizer souce materials and should be capable of curing to bind the particles of the spike together into a hard rigid briquette. The urea-formaldehyde resin contemplated as a binder is prepared from a urea to formaldehyde ratio ranging from about 1 mole urea per 1.38 to 1.8 mole formaldehyde.

Ordinarily, less than 10 percent by weight of the mixture shaped into the spike will be binder. The remainder of the mixture is preferably NPK source material and a small amount of free moisture. Usually not more than 5 percent of the mixture is moisture and from 90 percent to 93 percent by weight of the mixture is NPK source material. The amount of water required in the mixture to cure the thermoset resin may be reduced by using elevated temperatures to cure the resin. However, it is usually preferred to cure the briquette at room temperature.

It has been found that a briquette prepared from a mixture containing 5 percent by weight or less water has a green strength which permits it to be handled without significant crumbling and will cure at temperatures of 70°F. or less in a few hours. Small amounts of a catalyst such as ammonium chloride may be added to the mixture to accelerate curing if desired. Most fertilizer source materials are somewhat hygroscopic so moisture will be absorbed from the air by the green briquette. Hence, it is seldom necessary to add any water to the mixture before it is shaped into a spike. Preferably, the moisture content of the mixture will range from about 1.5 percent to about 2.5 percent by weight.

It is preferred to use a granular thermoset resin as a binder. However, a solution of the binder may be used provided the liquid phase is removed or does not interfere with the molding process.

It has been found that the novel wedge-shaped spike provided by this invention releases the plant nutrients slowly and is particularly well suited for fertilizing trees, shrubs or any growing plants. It is much easier to drive the spike to just below the surface of the ground than it is to follow the conventional procedure of drilling a hole of up to 24 inches in depth and placing granulated fertilizer therein. The spike has the further advantage that the plant nutrients are available to the roots of the tree from close to the surface down to the depth of the root zone whereas a granular fertilizer placed in the bottom of a hole is available only from the depth of the hole downwardly.

Although the invention has been described in detail for the purposes of illustration, it is to be understood that such detail is solely for that purpose and that variations can be made therein by those skilled in the art without departing from the spirit and scope of the invention except as it may be limited by the claims.

The embodiments of the invention in which an exclusive property or privilege is claimed are defined as follows:

1. A one-piece generally wedge-shaped spike comprising particles of fertilizer source materials bound together by a cured thermoset resin, said spike having an elongated body which is substantially elliptical in cross-section, a blunt end and a substantially hemi-ellipsoidal shaped end.

2. The spike of claim 1 wherein said blunt end is a boss integral with the body and the body has an edge adjacent to the boss which is arcuate in cross-section.

3. The spike of claim 1 wherein the thermoset resin is a cured water insoluble urea-formaldehyde.

4. The spike of claim 1 which is a briquette.

5. The spike of claim 1 consisting essentially of granular particles of fertilizer source materials bound together by said cured thermoset resin.

6. A one-piece generally wedge-shaped spike adapted to be driven into the ground comprising particles of fertilizer source materials bound together by a cured thermoset resin, said spike having an elongated body which is substantially elliptical in cross-section, a blunt end and a substantially hemi-ellipsoidal shaped end, and a plastic cap disposed over the blunt end, said cap having a wall which is substantially elliptical in cross-section, an open end about the body of the spike and a closed end disposed on the blunt end of the spike.

7. The spike of claim 6 wherein said blunt end thereof is a boss integral with the body and the edge of the body about the boss is arcuate shaped in cross-section, the closed end of the cap is disposed on the boss and the internal edge formed by the juncture of the wall with the closed end has a smaller radius than the radius of curvature of the edge of the spike body whereby an annular space is provided therebetween, said tubular wall fitting snugly over a portion of the spike body, and the closed end of the cap has a plurality of protuberances which combine to provide a discontinuous striking surface for the cap.

8. The spike of claim 7 wherein the cap is polypropylene.

9. The spike of claim 6 consisting essentially of granular particles of fertilizer source materials bound together by said cured thermoset resin.

10. A one-piece generally wedge-shaped briquette consisting essentially of particles of fertilizer source materials bound together by a cured thermoset resin, said briquette having an elongated body which is substantially elliptical in cross-section, a blunt end and a substantially hemi-ellipsoidal shaped end which adapt it to be hammered into the ground.

11. The briquette of claim 10 having a plastic cap disposed over the blunt end thereof having an open end and a closed end disposed on said blunt end of the spike.

12. The briquette of claim 11 wherein the binder is urea-formaldehyde.

13. The briquette of claim 10 wherein the binder is urea-formaldehyde.

* * * * *